United States Patent
Wu et al.

(10) Patent No.: US 10,404,086 B2
(45) Date of Patent: Sep. 3, 2019

(54) BATTERY FAST-CHARGING SYSTEM

(71) Applicant: GOOGLE INC., Mountain View, CA (US)

(72) Inventors: Xuelin Wu, Sunnyvale, CA (US); Christopher David Bernard, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 106 days.

(21) Appl. No.: 15/642,921

(22) Filed: Jul. 6, 2017

(65) Prior Publication Data

US 2018/0013303 A1    Jan. 11, 2018

Related U.S. Application Data

(60) Provisional application No. 62/359,026, filed on Jul. 6, 2016.

(51) Int. Cl.
*H02J 7/00* (2006.01)
*H02M 3/07* (2006.01)
*H02J 7/02* (2016.01)
*H02M 1/00* (2006.01)

(52) U.S. Cl.
CPC ............ *H02J 7/0052* (2013.01); *H02J 7/007* (2013.01); *H02J 7/0068* (2013.01); *H02J 7/022* (2013.01); *H02M 3/07* (2013.01); *H02J 2007/0059* (2013.01); *H02J 2007/0062* (2013.01); *H02J 2007/0095* (2013.01); *H02M 2001/0045* (2013.01)

(58) Field of Classification Search
USPC .................... 320/107, 108, 109, 128, 145
See application file for complete search history.

(56) References Cited

U.S. PATENT DOCUMENTS

| | | |
|---|---|---|
| 5,844,399 A | 12/1998 | Stuart |
| 6,137,280 A | 10/2000 | Ackermann et al. |
| 6,456,035 B1 | 9/2002 | Crisp et al. |

(Continued)

OTHER PUBLICATIONS

International Search Report and Written Opinion received for PCT Patent Application No. PCT/US2017/040883, dated Sep. 21, 2017, 13 pages.

(Continued)

*Primary Examiner* — Brian Ngo
(74) *Attorney, Agent, or Firm* — Brake Hughes Bellermann LLP (57) ABSTRACT

An apparatus for charging a battery of a user device includes a charge pump that converts an input voltage, received from a power adapter, to a system voltage that is less than the input voltage based on a ratio of the charge pump, a regulator coupled between the system voltage output by the charge pump and a battery of the user device, the regulator configured to control a battery charging voltage applied to the battery of the user device and to provide isolation between the system voltage that is applied to one or more components of the user device and the battery charging voltage applied to charge the battery of the user device, and a controller configured to determine a difference between the system voltage applied to an input of the regulator and the charging voltage output by the regulator.

19 Claims, 4 Drawing Sheets

(56) References Cited

U.S. PATENT DOCUMENTS

| | | | |
|---|---|---|---|
| 2004/0257039 A1* | 12/2004 | Clift | H02J 7/0054 320/128 |
| 2005/0110559 A1* | 5/2005 | Farkas | H02M 3/07 327/536 |
| 2006/0033470 A1* | 2/2006 | Zhu | H02J 9/061 320/107 |
| 2008/0100272 A1 | 5/2008 | Yoshio | |
| 2008/0158915 A1* | 7/2008 | Williams | H02M 3/07 363/21.06 |
| 2009/0001937 A1* | 1/2009 | Densham | H02J 7/00 320/145 |
| 2009/0167260 A1* | 7/2009 | Pauritsch | H02J 7/0065 323/233 |
| 2011/0006731 A1* | 1/2011 | Wang | B60L 11/1816 320/109 |
| 2014/0077777 A1 | 3/2014 | Vemula | |
| 2015/0346792 A1* | 12/2015 | Rathi | G06F 1/266 713/310 |
| 2017/0187219 A1* | 6/2017 | Nguyen | H02J 7/025 |
| 2017/0237276 A1* | 8/2017 | Onishi | H02J 50/12 320/108 |
| 2017/0250555 A1* | 8/2017 | Zhang | H02J 7/0029 |
| 2018/0013303 A1* | 1/2018 | Wu | H02J 7/0052 |

OTHER PUBLICATIONS

International Preliminary Report on Patentability for PCT Application No. PCT/US2017/040883, dated Aug. 21, 2018, 17 pages.

* cited by examiner

BATTERY FAST-CHARGING SYSTEM

CROSS-REFERENCE TO RELATED APPLICATION

This application claims priority to U.S. Provisional Patent Application No. 62/359,026, filed on Jul. 6, 2016, entitled "BATTERY FAST-CHARGING SYSTEM", the disclosure of which is incorporated by reference herein in its entirety.

TECHNICAL FIELD

This description relates to battery charging systems.

BACKGROUND

Battery charging systems are provided to charge a battery for a user device. In some cases, the user device may allow either operation of the user device or charging of the battery, but not both to be performed at the same time. In other battery charging systems, both operation of the user device and battery charging may be performed in parallel, but significant system current, power and/or heat generated by the user device during operation and battery charging may require the user device to decrease the battery charging rate.

SUMMARY

In a general aspect, a disclosed example charging apparatus includes a charge pump to convert an input voltage provided by a power adapter to an internal voltage, a regulator to regulate a charging voltage for a battery, and a controller to sense a voltage across the regulator and to control the power adapter to adjust the input voltage provided by the power adapter.

In another general aspect, an apparatus is provided for charging a battery of a user device, the apparatus including: a charge pump that converts an input voltage, received from a power adapter, to a system voltage that is less than the input voltage based on a ratio of the charge pump, a regulator coupled between the system voltage output by the charge pump and a battery of the user device, the regulator configured to control a battery charging voltage applied to the battery of the user device and to provide isolation between the system voltage that is applied to one or more components of the user device and the battery charging voltage applied to charge the battery of the user device, and a controller configured to determine a difference between the system voltage applied to an input of the regulator and the battery charging voltage output by the regulator.

In another general aspect, an apparatus is provided for charging a battery of a user device, the apparatus including: a charge pump that converts an input voltage, received from a power adapter, to a system voltage that is less than the input voltage based on a ratio of the charge pump, a regulator coupled between the system voltage output by the charge pump and a battery of the user device, the regulator configured to control a battery charging voltage applied to the battery of the user device and to provide isolation between the system voltage that is applied to one or more components of the user device and the battery charging voltage applied to charge the battery of the user device and, a controller coupled to the charge pump and the regulator, the controller configured to: determine a voltage difference between the system voltage applied to an input of the regulator and a charging voltage output by the regulator; and send a control signal to the power adapter to cause the power adapter to adjust, based on the voltage difference, the input voltage provided by the power adapter to the charge pump, wherein the power adapter is an adjustable voltage power adapter.

DETAILED DESCRIPTION

Existing methods to fast-charge (e.g., 50% charge in 10 minutes) a user device (e.g., a smartphone, a tablet, a network, a laptop, etc.) typically generate too much heat, either on the user device or on the power adapter and cable (e.g., wall or plug-in adapter, a charger, etc.). An example prior-art fast-charging system is a so-called high voltage charge system that increases the input voltage of the user device, while maintaining the same input current (e.g., 3A (amps)), thus, increasing the input power. However, the charger circuit (e.g., a charger integrated circuit (IC)) inside the user device needs to step down the higher input voltage (e.g., 9V (volts) or 12V) to the lower battery voltage (e.g., <5V). This conversion is typically inefficient and, thus, may generate too much power loss on the user device. In such circumstances, it may be necessary to turn the display off during fast-charging to avoid the user device getting too hot. In some examples, the charger IC in the user device is a switching mode converter, a buck converter, or a buck-boost converter, and/or there is power loss due to the cable and/or connectors.

Another prior-art fast-charge system is a so-called direct charge system that adjusts the output voltage of the power adapter to match the battery voltage. Alternatively, the output current of the power adapter is regulated, and the output voltage of the power adapter adjusts to the battery voltage). In both instances there is little voltage conversion needed in the user device. Thus, the power loss on the user device may be reduced. However, the wall adapter needs to source more current (e.g., 6A), which may make the design of the wall adapter more challenging. For example, it may be hard to meet energy requirements, may require shorter cables, may require more expensive cables, may require cables with e-marking, may require larger output current, etc. In most instances, the direct charge system requires a regular charging circuit (buck or buck-boost) to work together.

The example battery fast-charge systems disclosed herein overcome at least these problems. The disclosed systems include a high-efficiency charge pump that steps down (e.g., converts) a high input voltage of the user device to a voltage close to the battery voltage. Alternatively, a charge pump may be used to step up the input voltage to a voltage close to the battery voltage. As the battery voltage increases and the charge voltage needs to increase, the user device can control the wall adapter to increase its output voltage in order to maintain a sufficient charging current. In some examples, the charge pump is a fixed ratio converter. To prevent the battery voltage from exceeding a maximum voltage, a low dropout (LDO) linear regulator may be positioned between the charge pump and the battery. Other devices may be used instead of a LDO regulator. By using a charge pump instead of a buck or buck-boost converter, efficiency is increased and generated heat is decreased. This enables fast-charging for a longer duration or while the user device is being used. The disclosed examples also reduce the overheating inherent with direct charge systems.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Figure 1A:
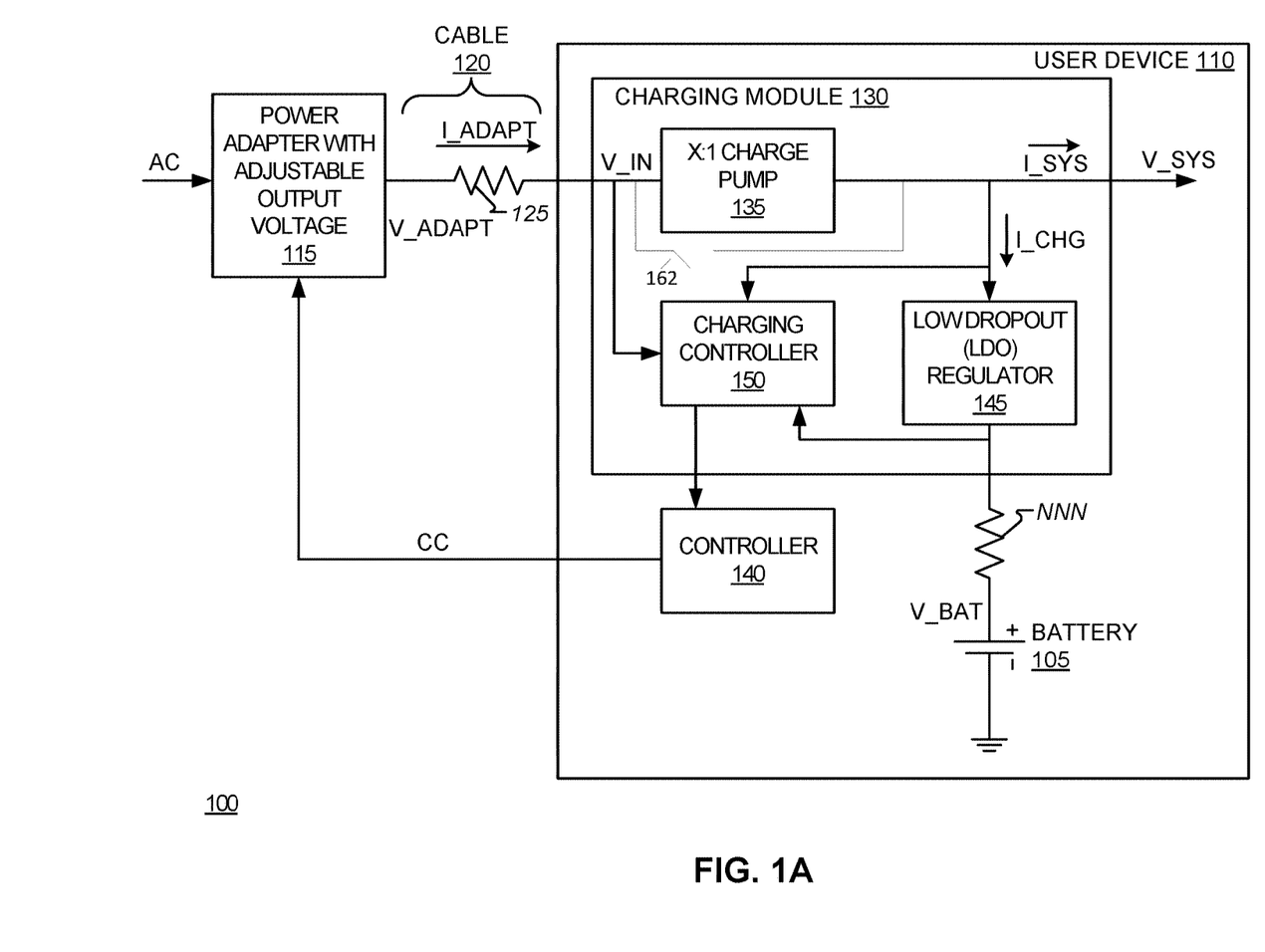
FIG. 1A is a block diagram of an example battery fast-charging system in accordance with this disclosure.

Turning to FIG. 1A, a block diagram of an example battery fast-charging system 100 is shown. The example system 100 of FIG. 1A may be used to fast-charge a battery 105 that may be used to power a user device 110, such as a smartphone, a tablet, a network, a laptop, the devices 300 and 350 of FIG. 3, etc. The example user device 110 of FIG. 1A has power supplied by a power adapter 115, such as a charger, a wall adapter, etc. that converts an alternating current (AC) signal to a direct current (DC) signal provided to the user device 110. The DC signal output by the power adapter 115 is provided to the user device 110 via cable 120. In the example of FIG. 1A, the cable 120 is represented by a resistance 125 that reflects, at least, wire and connector resistance. Other models for the cable 120 may be used. In some examples, the power adapter 115 has an output voltage that can be controlled and/or negotiated by a controller 140 via the control channel (CC) of a universal serial bus (USB) Type-C power delivery (PD) power adapter. An example USB PD power adapter supports output voltages between 5V and 20V in 10 mV steps. In some examples, components of the user device 110 communicate via an inter-integrated circuit (I2C) communication protocol.

To charge the battery 105, the example user device 110 includes a charging module 130 in accordance with the teachings of this disclosure. The charging module 130 converts an input voltage V_IN (e.g., 9V) into a charging voltage V_BAT for the battery 105. In some examples, the voltage V_IN is the output voltage V_ADAPT (e.g., 10V) of the power adapter 115 minus the voltage drop across the cable 120 and connectors. In some examples, the charging module 130 is implemented separate from the user device 110. For example, the battery 105 may be separable from the user device 100, charged by the charging module 130, and then re-connected to the user device 110.

To convert the input voltage V_IN to the charging voltage V_BAT, the example charging module 130 includes a fixed ratio X:1 charge pump 135. Among other things, the charge pump 135 converts the input voltage V_IN to form a supply voltage V_SYS for other parts of the user device 110. Example other parts of the user device 110 include, but are not limited to, the processor or controller 140, memory, a Wi-Fi® module, a cellular module, a display, etc. In some examples, V_ADAPT is 10V, the charge pump 135 has a ratio of 2:1, and V_SYS is approximately 4.5V. An example charge pump 135 is a high efficiency (e.g., 98%) switch capacitor regulator. In some examples, the charge pump 135 is unregulated, and/or may include or be associated with over current protection (OCP). Use of the high efficiency charge pump 135, allows the power adapter 115 to output a high output voltage V_ADAPT and low output current I_ADAPT, which simplifies the design of the power adapter 115. Further, the heat generated by the charge pump 135 is lower than in high-voltage charge systems, which allows the user device 110 to be used during fast-charging of the battery 105.

To regulate the voltage V_BAT, the example charging module 130 includes a regulator 145. An example regulator 145 is the MIC5159 low dropout (LDO) regulator sold by Microchip Technology Inc., which may be configured to have an efficiency of greater than 98%. The regulator 145 regulates its dropout voltage (e.g., the voltage across the regulator 145). For example, as the voltage V_BAT of the battery 105 increases while the voltage V_ADAPT is held constant, the dropout voltage decreases. When the dropout voltage becomes too low, the output voltage V_ADAPT of the power adapter 115 needs to be increased. The controller 140 increases V_ADAPT via the CC of the power adapter 115. A lower dropout voltage increases efficiency. When the dropout voltage becomes too high, the output voltage V_ADAPT of the power adapter 115 needs to be decreased. The controller 140 controls the power adapter 115 to decrease V_ADAPT.

In some examples, the high efficiency charge pump 135 and the high efficiency regulator 145 together operate at an efficiency of 96%, which generates 0.8 W of power loss on the device. This power loss enables fast-charging without overheating the device, so a user can operate the device while the device is being fast-charged.

To monitor and control the dropout voltage of the regulator 145, the example charging module 130 includes a charging controller 150. The example charging controller 150 monitors the dropout voltage of the regulator 145. If the dropout voltage becomes too high (e.g., greater than 60 mV or 80 mV for a 10 mOhm MOSFET associated with the LDO regulator 145 and a charging current of 4.5 A), the charging controller 150 notifies the controller 140 to control the power adapter 115 to decrease its output voltage V_ADAPT. When maintaining the dropout voltage at a small voltage, the regulator 145 can operate at a high efficiency. Among other things, the charging control 150 may also monitor the input current I_ADAPT (e.g., 3 A), monitor the current of the charge pump 135, etc. In some examples, the controller 140 is a USB PD controller. In other examples, the controller 140 is a general or application specific controller or processor that implements, among other things, a USB PD controller.

While example components and component specifications are shown and/or described herein, the example apparatus and methods described herein may be implemented using other components and/or components having other specifications. In one example, a 2 cell battery is charged using a 2:1 charge pump and an adapter output voltage of 15.6V. In another example, a 3 cell battery is charged using 1.33:1 charge pump providing 60 W charging. In still another example, a 1 cell battery is charged using a charge pump having a 3:1 or higher ratio to increase charging current. While the apparatus of FIG. 1A is shown as a circuit of discrete components it may, in part or in whole, be implemented as an integrated circuit.

Also, with reference to FIG. 1A, as the battery 105 charges, the battery voltage V_BAT will typically increase. Controller 150 may detect (or detect a change in) the voltage across regulator 145 (e.g., the voltage difference between V_SYS and V_BAT), which may be reported to controller 140. Controller 140 may then send a control signal to power adapter 115 to increase the V_ADAPT and the input voltage (V_IN) input to the charge pump 135, e.g., so that the voltage (V_SYS) output by charge pump 135 will continue to track (e.g., within an offset of around 60 mv or other value) the battery voltage V_BAT as V_BAT continues to increase, for example.

Furthermore, referring to FIG. 1A, a X:1 charge pump 135 may be used to decrease the system voltage V_SYS that is input to the regulator 145. For example, a 10V input to a 2:1 charge pump may cause the charge pump 135 to output a system voltage (V_SYS) of approximately 5.0 volts, and will significantly decrease the input current I_ADAPT (and may also decrease the system current I_SYS and/or charging current I_CHG). In an example implementation, the current I_ADAPT may create significant power loss and heat generation based on cable and connector resistance 125. Energy efficiency may be calculated by taking into account any power loss across cable resistance 125, where power=$i^2R$, where i is the current and R is the cable resistance 125, for example. Thus, by using a X:1 (e.g., a 2:1) charge pump, the current I_ADAPT may be reduced, for example, to half of its original value, causing power in this example to decrease to only $\frac{1}{4}^{th}$ of an original current value, given that power varies according to the square of the current. Thus, use of a X:1 (where X may be greater than 1) charge pump may improve power loss and energy efficiency by reducing the voltage V_SYS and reducing the current(s) I_ADAPT, I_SYS and/or I_CHG. In addition, for example, through the use of a X:1 charge pump to reduce the current (e.g., significantly reduce I_ADAPT), a standard current power adapter may be used, and a more expensive high current power adapter may be avoided, thereby decreasing system cost, for example.

According to an example implementation, the LDO regulator 145 may perform several functions and/or offer several advantages, such as, for example: 1) to regulate the voltage V_BAT applied to the battery 105, e.g., to avoid overcharging the battery 105; and 2) to isolate the system voltage V_SYS (and system components connected thereto) from the voltage V_BAT output by regulator 145 to charge the battery 105. Thus, for example, regulator 145 may provide isolation, such as voltage isolation, between system voltage V_SYS and the voltage V_BAT output to charge the battery. Voltage isolation may include, for example, allowing the voltages V_SYS and V_BAT to be independent (or at least partially independent) from each other, and/or to allow one of these voltages to vary (e.g., increase or decrease) without necessarily impacting (or causing a change to) the other voltage. For example, in some cases, the voltage V_SYS may fluctuate or vary fairly rapidly depending on the load of one or more system components of the user device that may be operating. However, a rapidly varying voltage V_BAT applied to the battery would cause a rapidly changing current to the battery, which may lead to overcharging of the battery and/or damage to the battery or unpredictable charging. Battery 105 may be very sensitive to the voltage and/or current applied for charging, and an unintended increase in charging voltage can cause a spike or significant increase in charging current, which may be damaging to the battery 105 or provide other negative consequences. Therefore, the LDO regulator 145 isolates the voltage V_BAT applied to the battery 105 from the (e.g., frequent and/or rapid) changes in the system voltage V_SYS that may be applied to the system components of the user device, e.g., to improve battery charging and/or to reduce possible damage to the battery 105.

Furthermore, referring to FIG. 1A, the system or architecture of the charging module 130 and the controller 140 may: 1) reduce power loss during battery charging, e.g., based on a reduced current (e.g., reduced I_ADAPT), which may reduce power loss and/or decrease or reduce the generation of heat by the user device 110; and, 2) enable a user to charge the battery 105 at the same time the user may be using the user device 110 (e.g., playing a 3D video game, which may use significant power and current). For example, by using X:1 charge pump, V_SYS may be decreased or reduced, and this may cause the current (e.g., I_ADAPT) to be significantly decreased, thereby reducing power and heat generated by the user device. This lower current and lower power (e.g., based on the X:1 charge pump 135) may allow the user device to both be used/operated by a user while at the same time being charged at a high charging rate. For example, because the user device, with lower current I_ADAPT may generate less heat, and it may not be necessary to decrease the charging rate to avoid overheating the user device, (since a lower power operation is provided). That is, for example, if user device 110 generates too much heat during simultaneous use/operation and battery charging, the battery charging may be turned off or provided at a lower charging rate, or a screen/display of the user device (for example) may be dimmed or turned off, e.g., to avoid overheating the user device 110. On the other hand, according to an example implementation, less power and less heat will be generated in user device 110 due to the lower current, based on the X:1 charge pump 135, which, at least in some cases, may therefore allow a higher charging rate to be used without overheating the user device.

According to an example implementation, the X:1 charge pump may be a step-down charge pump that may step-down or decrease an input voltage by the ratio. For example, a 10V input may be stepped down by 2 (the ratio) to output a voltage of approximately 5 V. Other input voltages and ratios may be used, such as a 15 volt input, and a ratio of 3:1 to still provide an output voltage (e.g., V_SYS) of about 5 volts. Some example batteries may be charged up to around 5 volts, or just less than 5 volts, such as 4.4 volts, as an illustrative example.

As noted, in some cases, power adapter 115 may be an adjustable voltage power adapter, e.g., where the voltage V_ADAPT may be adjusted or varied based on a control signal from a controller 140, for example. However, a situation may arise where the power adapter 115 connected to the user device 110 is not an adjustable voltage power, but is a fixed voltage power adapter, e.g., providing a fixed voltage of about 5 Volts (or other voltage), such as the power adapter 115A in FIG. 1B. According to an example implementation, given a 2:1 ratio of the charge pump 135, this input voltage of 5 volts may be too low to be input into 2:1 charge pump, since the resulting output voltage would be around 2.5 volts, which is too low to charge the battery 105 up to 4.4 volts, according to this illustrative example.

Therefore, in order to accommodate (e.g., on the fly or dynamically, as sensed by a controller) a power adapter that is a fixed (or static) voltage power adapter, a switch 162 (FIG. 1A) may be provided. In an example implementation, the state or position of switch 162 may be controlled by controller 150 or 140, e.g., either based on the voltage V_IN output by power adapter that is connected to the user device 110 or based on a control signal or a power profile received by controller 150 from the connected power adapter (e.g., based on a control signal indicating the type of power adapter that is connected, e.g., indicating either an adjustable voltage power adapter or a fixed voltage power adapter). For example, charging controller 150 may detect the input voltage V_IN. For example, if V_IN is less than a threshold (e.g., less than 9 volts), (or if controller 150 receives a control signal from the power adapter indicating a fixed voltage power adapter providing a voltage less than the threshold), then the controllers 150, 140 may close the switch 162 so as to bypass the 2:1 charge pump and allow the input voltage V_IN to be directly applied to the regulator 145 (without being stepped down). This is because the input voltage, in this example, is already an appropriate voltage for charging the battery, for example, and stepping down such voltage cannot be used to charge the battery, which requires 4.4 volts or so, which is greater than a stepped down 2.5 volts in such an example. On the other hand, if controller 150, for example, detects (or receives a control signal indicating) an input voltage that is greater than or equal to 9 volts, then the state of the switch 162 may be opened by controllers 150, 140, to enable or allow the X:1 charge pump to step down or convert the input voltage (e.g., step down 10 volts to 5 volts). Thus, a switch 162 in FIG. 1A may, in some cases, be provided within the charging module 130, e.g., to flexibly accommodate both adjustable and fixed voltage power adapters, for example, without requiring an additional conventional battery charger as used in FIG. 1B (e.g., the switch 162 in FIG. 1A allows accommodation of a fixed voltage power adapter, e.g., without the additional cost of using a conventional batter charger, which is used in the example of FIG. 1B). This is merely an illustrative example, and other numbers, voltages, ratios, etc. may be used.

Figure 1B:
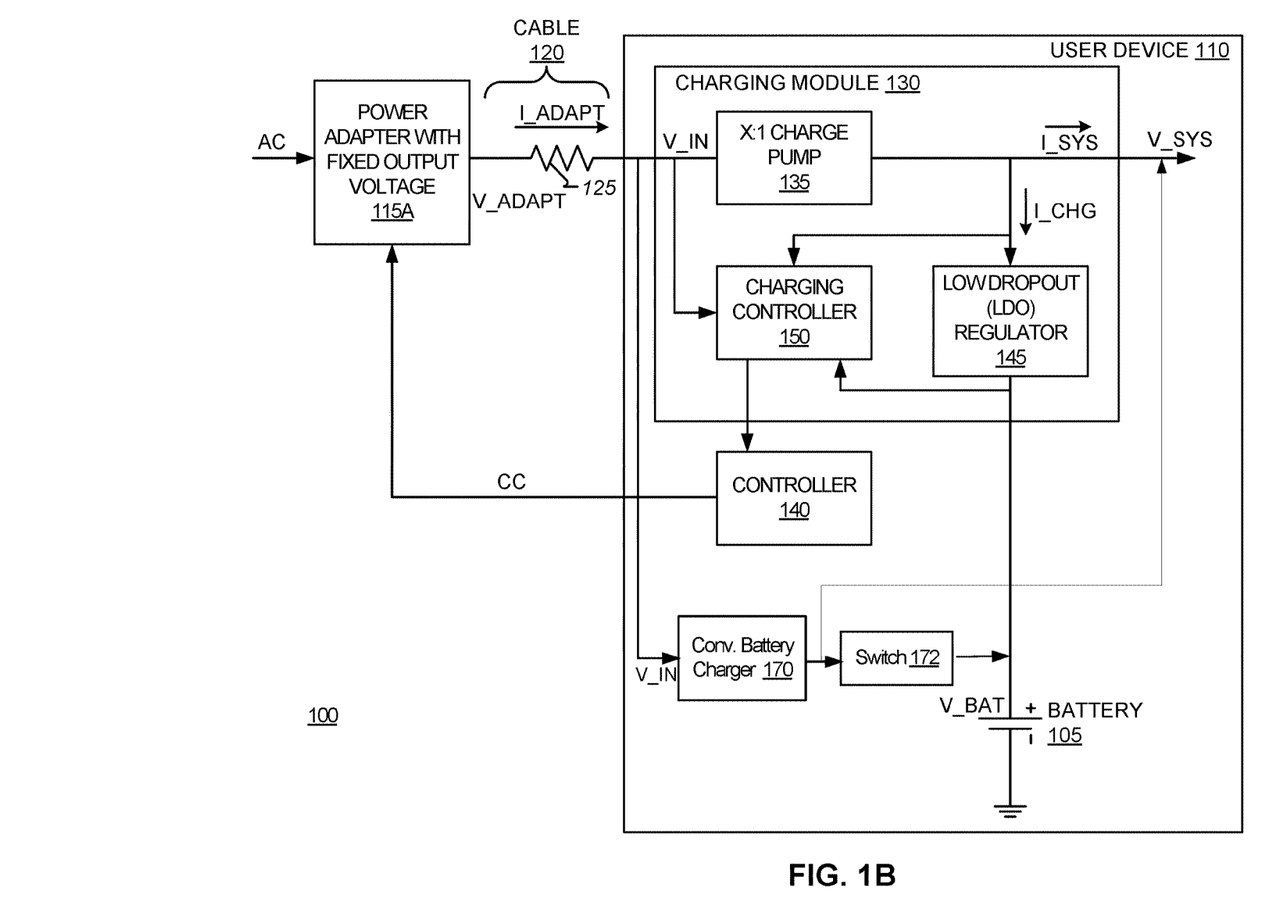
FIG. 1B is a block diagram of another example battery fast-charging system in accordance with this disclosure.

FIG. 1B is a block diagram of another example battery fast-charging system in accordance with this disclosure in which two battery chargers are provided. As noted, in some cases, the power adapter 115A (FIG. 1B) may be a fixed voltage power adapter, e.g., providing an output at either one fixed voltage (e.g., 5v), or providing one of several possible discrete voltages such as 5v, 9v, 12v, 20v. According to an example implementation, in such a case where a fixed voltage power adapter 115A is connected or plugged in to the user device, the power adapter 115A will not be able to be adjusted (increase or decrease output voltage) based on a USB control signal received from controller 140, for example. Therefore, to accommodate the possibility that a fixed voltage power adapter may be connected to the user device, a conventional battery charger 170 (e.g., a buck or buck-boost battery charger) and a switch 172 may be provided as shown in FIG. 1B. Switch 172 may be used to switch in or out the conventional battery charger 170 (turn on battery charger 170 when charging the user device, or turn off conventional battery charger 170 when user device 110 is in use/operation).

According to an example implementation, referring to FIG. 1B, controller 140 may receive a control signal (e.g., USB control signal indicating a power profile of the connected power adapter 115/115A) that indicates a type of power adapter is connected, e.g., indicating either an adjustable voltage power adapter or a fixed voltage power adapter. Also, for example, in the absence of a control signal (e.g., indicating a power profile of the power adapter) received by controller 140 via USB control channel from the power adapter 115, the controller 140 may assume that the power adapter is a fixed voltage power adapter. And, for example, the controller 140 and/or controller 150 may enable either: 1) the battery charging via the charge pump 135 and regulator 145 for an adjustable voltage power adapter, or 2) the conventional battery charger 170 for a fixed voltage power adapter. For example, if the power adapter is a fixed voltage power adapter, then controller 140, 150 may disable or turn off the regulator 145, and then may enable the conventional battery charger 170. Similarly, when the power adapter is adjustable, then the controllers 140 and/or 150 may enable regulator 145 and may disable conventional power adapter 170.

In some cases, a disadvantage of conventional battery charger 170 is that it may not necessarily charge the battery when the user device 110 is being operated or in use. Hence the switch 172 may be closed during battery charging, and open during device operation when the power adapter is a fixed voltage power adapter, according to an example implementation.

Thus, in this manner, according to an illustrative example implementation as shown in FIG. 1B, two different types of chargers may be provided, and the user device 110 may dynamically sense the type of power adapter that is connected, and then enable the appropriate battery charger.

Figure 2:
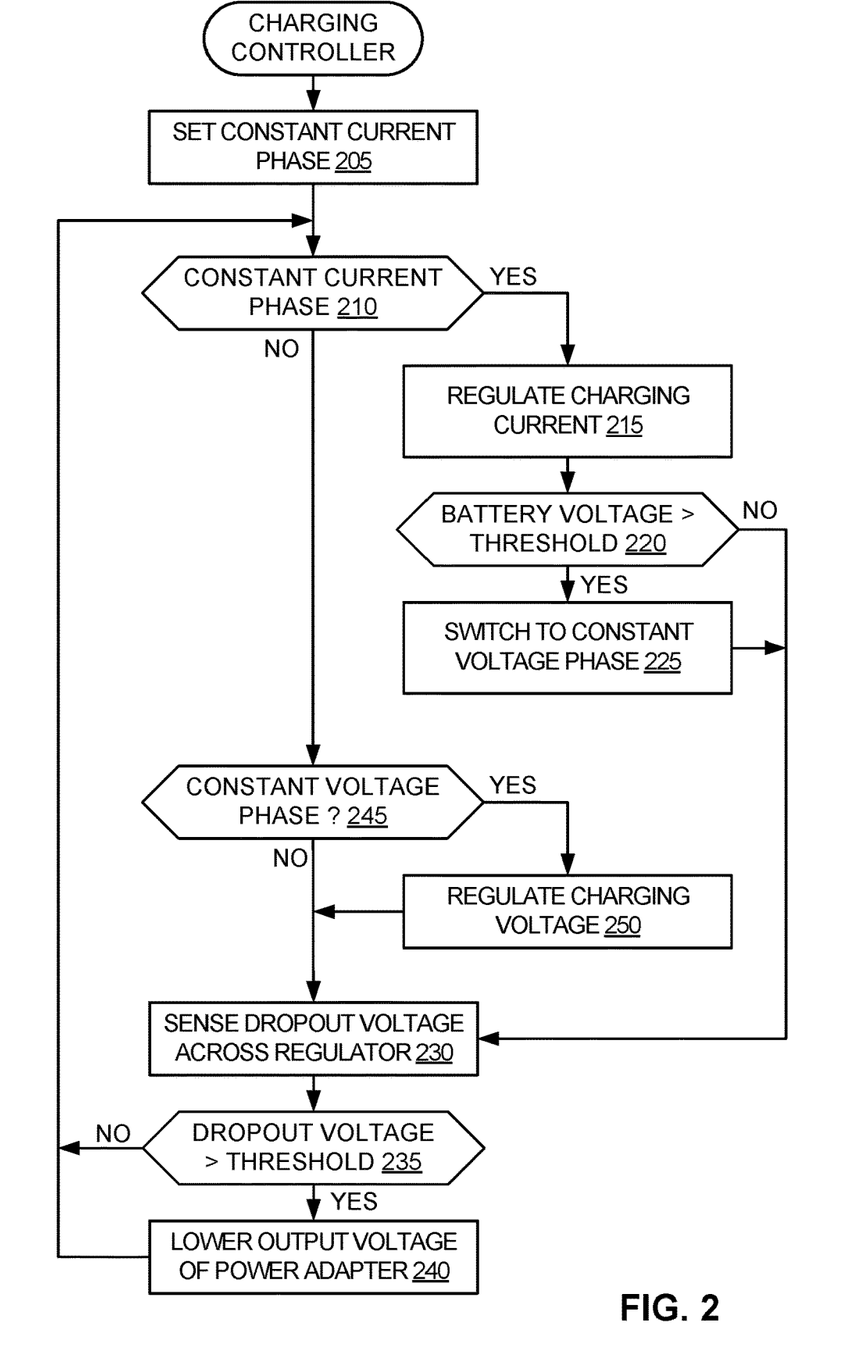
FIG. 2 is a flowchart representing an example method that may be used to fast-charge a battery using the example systems disclosed herein.
Figure 3:
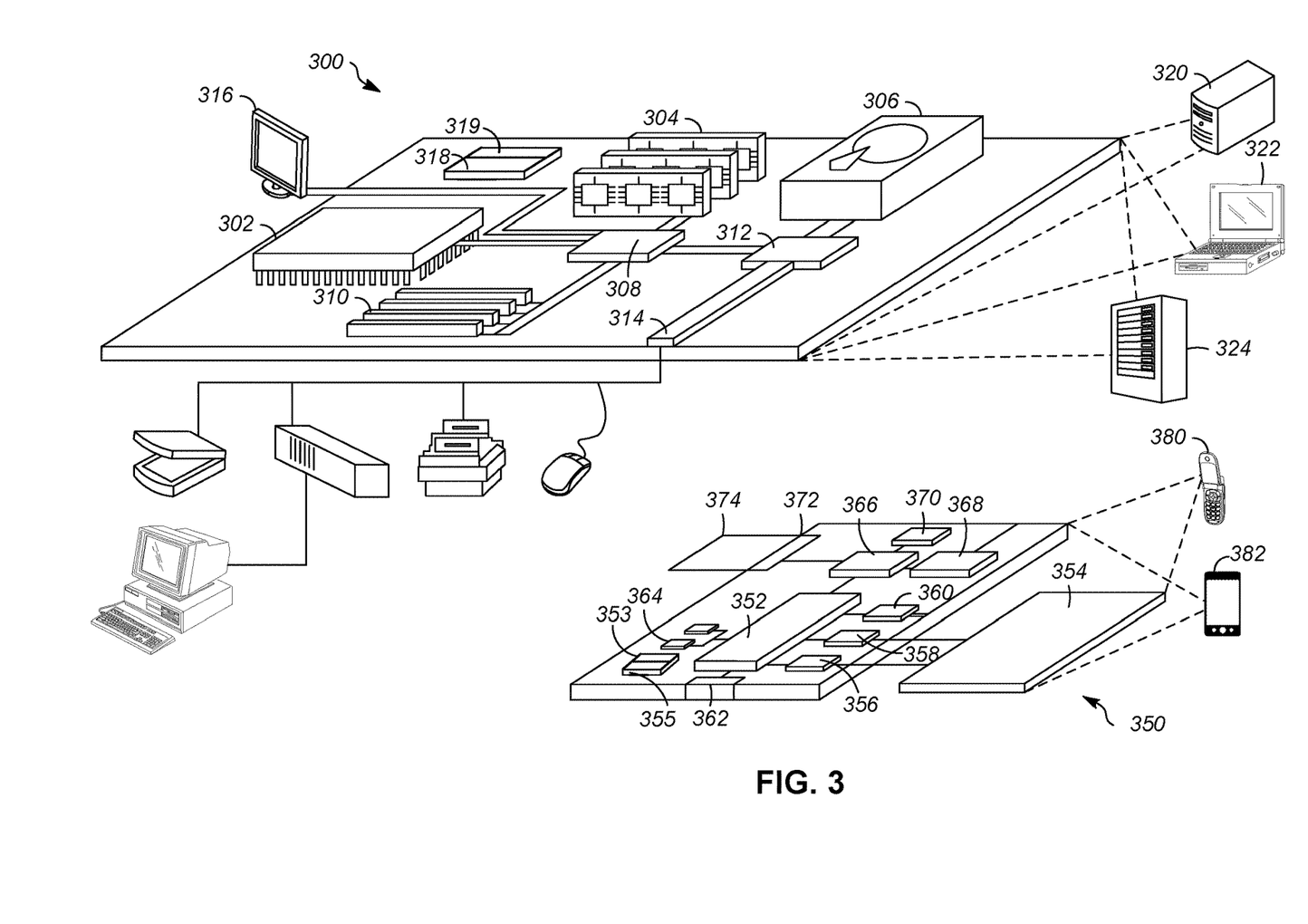
FIG. 3 is a block diagram of an example computer device and an example mobile computer device, which may be used to implement the examples disclosed herein.

FIG. 2 is a flowchart of an example method that may, for example, be implemented as machine-readable instructions carried out by one or more processors, such as the example processors 300 and 350 of FIG. 3, to implement the example battery fast-charging methods disclosed herein. The example method of FIG. 3 includes setting the charger module to a constant current phase (block 205). If the charger module is in the constant current phase (block 210), the LDO regulator regulates the charging current to be generally constant (block 215). As the battery charges, the battery voltage V_BAT increases. When the battery voltage V_BAT meets or exceeds a threshold (block 220), the charger module is changed to a constant voltage phase (block 225), and control proceeds to block 230. Returning to block 220, if the battery voltage V_BAT does not meet or exceed the threshold (block 220), control proceeds to block 230 without changing to the constant voltage phase. The proposed methods and systems disclosed herein not only work with constant current, constant voltage charging methods, but other charging methods, such as pulsed charging, etc.

At block 230, the dropout voltage across the LDO regulator is sensed (block 230). If the dropout voltage meets or exceeds a threshold (block 235), the output voltage of the power adapter is adjusted to a lower voltage (block 240). Control returns to block 210. If the dropout voltage does not meet or exceed the threshold (block 235), control returns to block 210 without adjusting the output voltage of the power adapter.

Returning to block 210, if the charging module is not in the constant current phase (block 210), and the charging module is in the constant voltage phase (block 245), the LDO regulator regulates the charging voltage (block 250) and control proceeds block 230. One or more of the disclosed charging circuit, apparatus and systems can be configured in parallel to increase the power being delivered to the battery.

Example 1

According to an example implementation, an apparatus is provided for charging a battery of a user device, the apparatus including a charge pump that converts an input voltage, received from a power adapter, to a system voltage that is less than the input voltage based on a ratio of the charge pump; a regulator coupled between the system voltage output by the charge pump and a battery of the user device, the regulator configured to control a battery charging voltage applied to the battery of the user device and to provide isolation between the system voltage that is applied to one or more components of the user device and the battery charging voltage applied to charge the battery of the user device; and a controller configured to determine a voltage across the regulator (e.g., the voltage difference between the system voltage applied to an input of the regulator and the battery charging voltage output by the regulator to charge the battery).

Example 2

According to an example implementation of example 1, wherein the controller is configured to: determine a voltage difference between the system voltage applied to an input of the regulator and a charging voltage output by the regulator; and send a control signal to the power adapter to cause the power adapter to adjust, based on the voltage difference, the input voltage provided by the power adapter input to the charge pump, wherein the power adapter is an adjustable voltage power adapter.

Example 3

According to an example implementation of any of examples 1-2, the controller is configured to: send a control signal to the power adapter to cause the power adapter to adjust the input voltage provided by the power adapter input to the charge pump in attempt to maintain the voltage difference between the system voltage applied to an input of the regulator and a charging voltage output by the regulator as a fixed value.

Example 4

According to an example implementation of any of examples 1-3, wherein the controller comprises: a first controller configured to determine a difference between the system voltage applied to an input of the regulator and a charging voltage output by the regulator; and a second controller, coupled to the first controller and the power adapter, configured to send a control signal to the power adapter to cause the power adapter to adjust, based on the voltage difference, the input voltage provided by the power adapter and input to the charge pump.

Example 5

According to an example implementation of any of examples 1-4, the charge pump comprises: a fixed ratio charge pump having a ratio that is 2:1 or greater.

Example 6

According to an example implementation of any of examples 1-5, wherein the charge pump comprises: a fixed ratio charge pump having a ratio that is 2:1 or greater, configured to convert an input voltage, received from a power adapter, to a system voltage that is less than the input voltage based on a ratio of the charge pump, wherein the charge pump is also configured to decrease a charge current output by the charge pump based on the ratio of the charge pump, wherein the decreased charge current output by the charge pump allows both operation of the user device in parallel with a high rate battery charging.

Example 7

According to an example implementation of any of examples 1-6, wherein the regulator comprises: a regulator coupled between the system voltage output by the fixed ratio charge pump and a battery of the user device, the regulator configured to provide isolation between the system voltage that is applied to one or more components of the user device and the battery charging voltage applied to charge the battery of the user device, wherein the isolation provided by the regulator allows short term variation in the system voltage applied to one or more components of the user device while reducing changes or variation in charging voltage due to the variations in the system voltage.

Example 8

According to an example implementation of any of examples 1-7, wherein the charge pump comprises: a switch capacitor regulator.

Example 9

According to an example implementation of any of examples 1-8, wherein the charge pump comprises overcurrent protection.

Example 10

According to an example implementation of any of examples 1-9, and further comprising: a conventional battery charger coupled between the input voltage output by the power adapter and the battery, the conventional battery charger configured to apply the battery voltage to charge the battery when the power adapter is a fixed voltage power adapter where a voltage output by the power adapter cannot be adjusted based on a control signal from the controller.

Example 11

According to an example implementation of any of examples 1-10, wherein the conventional battery charger comprises at least one of a Buck type battery charger and a Buck boost type battery charger.

Example 12

According to an example implementation of any of examples 1-11, and further comprising: a conventional battery charger coupled between the input voltage output by the power adapter and the battery; wherein the controller is configured to determine a power adapter type of the power adapter as either an adjustable voltage power adapter or a fixed voltage power adapter; wherein the controller is configured to charge the battery via use of the charge pump and the regulator if the power adapter is an adjustable power adapter; and wherein the controller is configured to charge the battery via the conventional battery charger if the power adapter is a fixed voltage power adapter.

Example 13

According to an example implementation of any of examples 1-12, wherein the controller being configured to determine a power adapter type of the power adapter as either an adjustable voltage power adapter or a fixed voltage power adapter comprises the controller being configured to: receive, by the controller from the power adapter, a control signal indicating power adapter type of the power adapter.

Example 14

According to an example implementation of any of examples 1-13, wherein the controller being configured to determine a power adapter type of the power adapter as either an adjustable voltage power adapter or a fixed voltage power adapter comprises the controller being configured to: fail to receive, by the controller from the power adapter, a control signal indicating power adapter type of the power adapter; and determine, based on the failure to receive a control signal indicating a power adapter type, that the power adapter is a first type of power adapter.

Example 15

According to an example implementation of any of examples 1-14, wherein the controller being configured to determine a power adapter type of the power adapter as either an adjustable voltage power adapter or a fixed voltage power adapter comprises the controller being configured to: fail to receive, by the controller from the power adapter, a control signal indicating power adapter type of the power adapter; and determine, based on the failure to receive a control signal indicating a power adapter type, that the power adapter is a fixed voltage power adapter.

Example 16

According to an example implementation of any of examples 1-15, wherein the controller being configured to determine a power adapter type of the power adapter as either an adjustable voltage power adapter or a fixed voltage power adapter comprises the controller being configured to: fail to receive, by the controller from the power adapter, a power profile via universal serial bus (USB) control signal indicating a power adapter type of the power adapter; and, determine, based on the failure to receive the power profile via USB control signal indicating a power adapter type, that the power adapter is a fixed voltage power adapter.

Example 17

According to an example implementation of any of examples 1-16, wherein the controller being configured to determine a power adapter type of the power adapter as either an adjustable voltage power adapter or a fixed voltage power adapter comprises the controller being configured to: fail to receive, by the controller from the power adapter, a power profile via universal serial bus (USB) control signal indicating a power adapter type of the power adapter; and determine, based on the failure to receive the power profile via USB control signal indicating a power adapter type, that the power adapter is a fixed voltage power adapter.

Example 18

According to an example implementation of any of examples 1-17, and further comprising: a switch, configurable to either enable or bypass the charge pump.

Example 19

According to an example implementation of any of examples 1-18, and further comprising: a switch, configurable to either enable or bypass the charge pump; wherein the controller is configured to: determine that the power adapter is a fixed voltage power adapter that is configured to output an input voltage at a first voltage; configure the switch to enable the charge pump if the first voltage is greater than or equal to a threshold value; and configure the switch to bypass the charge pump, and thus avoid voltage conversion of the charge pump, if the first voltage is less than the threshold value.

Example 20

According to an example implementation of any of examples 1-19, and further comprising: a switch, configurable to either enable or bypass the charge pump; wherein the controller is configured to: determine that the power adapter is a fixed voltage power adapter that is configured to output an input voltage at a first voltage that is less than a threshold; and configure the switch to bypass the charge pump, and thus avoid voltage conversion of the charge pump, based on the first voltage being less than the threshold value.

Example 21

According to an example implementation, an apparatus is provided for charging a battery of a user device, the apparatus comprising: a charge pump that converts an input voltage, received from a power adapter, to a system voltage that is less than the input voltage based on a ratio of the charge pump; a regulator coupled between the system voltage output by the charge pump and a battery of the user device, the regulator configured to control a battery charging voltage applied to the battery of the user device and to provide isolation between the system voltage that is applied to one or more components of the user device and the battery charging voltage applied to charge the battery of the user device; and a controller coupled to the charge pump and the regulator, the controller configured to: determine a voltage difference between the system voltage applied to an input of the regulator and a charging voltage output by the regulator; and send a control signal to the power adapter to cause the power adapter to adjust, based on the voltage difference, the input voltage provided by the power adapter to the charge pump, wherein the power adapter is an adjustable voltage power adapter.

Example 22

According to an example implementation of example 21, wherein the charge pump is configured to decrease an input current (e.g., I_ADAPT) to the charge pump (and/or decrease or reduce the output current(s) I_CHG and/or system current I_SYS) based on the converting the input voltage to the system voltage.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by a processor, a computer and/or a machine having a processor, such as the example processor platforms 300 and 350 discussed below in connection with FIG. 3. Example processors include, but are not limited to a circuit, a programmable processor, fuses, an application-specific integrated circuit (ASIC), a programmable logic device (PLD), a field-programmable logic device (FPLD), a field-programmable gate array (FPGA), a digital signal processor (DSP), a graphics processing unit (GPU), a central processing unit (CPU), a microcontroller, a controller, etc. Any of the elements and interfaces disclosed herein may, for example, be implemented as instruction, program code, machine-readable instructions, etc. carried out by one or more of a processor, a computer and/or a machine having a processor. A processor, a computer and/or a machine having a processor may be used, configured and/or programmed to execute and/or carry out the examples disclosed herein. For example, any of the examples may be embodied in instructions, program code, machine-readable instructions, etc. stored on a tangible and/or non-transitory computer-readable medium accessible by a processor, a computer and/or other machine having a processor, such as the example processor platforms 300 and 350 discussed below in connection with FIG. 3. Machine-readable instructions include, for example, instructions that cause a processor, a computer and/or a machine having a processor to perform one or more particular processes or methods.

The example methods disclosed herein may, for example, be implemented as instructions, program code, machine-readable instructions carried out by a processor, a computer and/or other machine having a processor. A processor, a controller and/or any other suitable processing device such as those shown in FIG. 3 may be used, configured and/or programmed to execute and/or carry out the example methods. For example, they may be embodied in instructions, program code and/or machine-readable instructions stored on a tangible and/or non-transitory computer-readable medium accessible by a processor, a computer and/or other machine having a processor, such as those discussed below in connection with FIG. 3. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, discrete logic, circuits, etc.

As used herein, the terms "computer-readable medium" and "machine-readable medium" expressly exclude propagating signals. Example computer-readable or machine-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a FLASH drive, a floppy disk, a Synchronous Dynamic Random Access Memory (SDRAM), a Dynamic Random Access Memory (DRAM), a RAMBUS Dynamic Random Access Memory (RDRAM) a programmable ROM (PROM), an electronically-programmable ROM (EPROM), an electronically-erasable PROM (EEPROM), a solid state (SS) memory, a solid state disk (SSD), an optical storage disk, an optical storage device, a magnetic storage disk, a network-attached storage (NAS) device, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

FIG. 3 shows an example of a generic computer device 300 and a generic mobile computer device 350, which may be used with the techniques described here. Computing device 300 is intended to represent various forms of digital computers, such as laptops, desktops, tablets, workstations, personal digital assistants, televisions, servers, blade servers, mainframes, and other appropriate computing devices. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document. The devices 300 and 350 may be used to implement, among other things, the example user device 110 of FIG. 1A.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. The processor 302 can be a semiconductor-based processor. The memory 304 can be a semiconductor-based memory. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system). The example computing device 300 includes a battery 318 for powering the device 300, and a charging module 319 (e.g., see the example module 130 of FIG. 1A) to charge the battery 318.

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.). The example computing device 350 includes a battery 353 for powering the device 350, and a charging module 355 (e.g., see the example module 130 of FIG. 1A) to charge the battery 353.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, Wi-Fi, or other such transceiver (not shown). In addition, GPS (Global positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. An apparatus for charging a battery of a user device, the apparatus comprising:
   a charge pump that converts an input voltage, received from a power adapter, to a system voltage that is less than the input voltage based on a ratio of the charge pump;
   a regulator coupled between the system voltage output by the charge pump and a battery of the user device, the regulator configured to control a battery charging voltage applied to the battery of the user device and to provide isolation between the system voltage that is applied to one or more components of the user device and the battery charging voltage applied to charge the battery of the user device; and
   a controller configured to:
   determine a difference between the system voltage applied to an input of the regulator and the battery charging voltage output by the regulator;
   determine a voltage difference between the system voltage applied to an input of the regulator and a charging voltage output by the regulator; and
   send a control signal to the power adapter to cause the power adapter to adjust, based on the voltage difference, the input voltage provided by the power adapter input to the charge pump, wherein the power adapter is an adjustable voltage power adapter.

2. The apparatus of claim 1 wherein the controller is configured to:
   send a control signal to the power adapter to cause the power adapter to adjust the input voltage provided by the power adapter input to the charge pump to attempt to maintain the voltage difference between the system voltage applied to an input of the regulator and a charging voltage output by the regulator as a fixed value.

3. The apparatus of claim 1 wherein the controller comprises:
   a first controller configured to determine a difference between the system voltage applied to an input of the regulator and a charging voltage output by the regulator; and
   a second controller, coupled to the first controller and the power adapter, configured to send a control signal to the power adapter to cause the power adapter to adjust, based on the voltage difference, the input voltage provided by the power adapter and input to the charge pump.

4. The apparatus of claim 1 wherein the charge pump comprises:
   a fixed ratio charge pump having a ratio that is 2:1 or greater.

5. The apparatus of claim 1 wherein the charge pump comprises:
   a fixed ratio charge pump having a ratio that is 2:1 or greater, and configured to convert an input voltage, received from a power adapter to a system voltage that is less than the input voltage based on a ratio of the charge pump, wherein the charge pump is also configured to decrease a charge current output by the charge pump based on the ratio of the charge pump, wherein the decreased charge current output by the charge pump allows both operation of the user device in parallel with a high rate battery charging.

6. The apparatus of claim 4 wherein the regulator comprises:

a regulator coupled between the system voltage output by the fixed ratio charge pump and a battery of the user device, the regulator configured to provide isolation between the system voltage that is applied to one or more components of the user device and the battery charging voltage applied to charge the battery of the user device, wherein the isolation provided by the regulator allows short term variation in the system voltage applied to one or more components of the user device while reducing changes or variation in the charging voltage due to the variations in the system voltage.

7. The apparatus of claim 1 wherein the charge pump comprises:
a switch capacitor regulator.

8. The apparatus of claim 1 wherein the charge pump comprises overcurrent protection.

9. The apparatus of claim 1 and further comprising:
a conventional battery charger coupled between the input voltage output by the power adapter and the battery, the conventional battery charger configured to apply the battery voltage to charge the battery when the power adapter is a fixed voltage power adapter where a voltage output by the power adapter cannot be adjusted based on a control signal from the controller.

10. The apparatus of claim 9 wherein the conventional battery charger comprises at least one of a Buck type battery charger and a Buck boost type battery charger.

11. The apparatus of claim 1 and further comprising:
a switch, configurable to either enable or bypass the charge pump.

12. The apparatus of claim 1 and further comprising:
a switch, configurable to either enable or bypass the charge pump;
wherein the controller is configured to:
determine that the power adapter is a fixed voltage power adapter that is configured to output an input voltage at a first voltage;
configure the switch to enable the charge pump if the first voltage is greater than or equal to a threshold value; and
configure the switch to bypass the charge pump, and thus avoid voltage conversion of the charge pump, if the first voltage is less than the threshold value.

13. An apparatus for charging a battery of a user device, the apparatus comprising:
a charge pump that converts an input voltage, received from a power adapter, to a system voltage that is less than the input voltage based on a ratio of the charge pump;
a regulator coupled between the system voltage output by the charge pump and a battery of the user device, the regulator configured to control a battery charging voltage applied to the battery of the user device and to provide isolation between the system voltage that is applied to one or more components of the user device and the battery charging voltage applied to charge the battery of the user device;
a conventional battery charger coupled between the input voltage output by the power adapter and the battery; and
a controller configured to:
determine a difference between the system voltage applied to an input of the regulator and the battery charging voltage output by the regulator;
determine a power adapter type of the power adapter as either an adjustable voltage power adapter or a fixed voltage power adapter;
charge the battery via use of the charge pump and the regulator if the power adapter is an adjustable power adapter; and
charge the battery via the conventional battery charger if the power adapter is a fixed voltage power adapter.

14. The apparatus of claim 13 wherein the controller being configured to determine a power adapter type of the power adapter as either an adjustable voltage power adapter or a fixed voltage power adapter comprises the controller being configured to:
receive, by the controller from the power adapter, a control signal indicating power adapter type of the power adapter.

15. The apparatus of claim 13 wherein the controller being configured to determine a power adapter type of the power adapter as either an adjustable voltage power adapter or a fixed voltage power adapter comprises the controller being configured to:
fail to receive, by the controller from the power adapter, a control signal indicating a power adapter type of the power adapter; and
determine, based on the failure to receive a control signal indicating a power adapter type, that the power adapter is a first type of power adapter.

16. The apparatus of claim 13 wherein the controller being configured to determine a power adapter type of the power adapter as either an adjustable voltage power adapter or a fixed voltage power adapter comprises the controller being configured to:
fail to receive, by the controller from the power adapter, a control signal indicating a power adapter type of the power adapter; and
determine, based on the failure to receive a control signal indicating a power adapter type, that the power adapter is a fixed voltage power adapter.

17. The apparatus of claim 13 wherein the controller being configured to determine a power adapter type of the power adapter as either an adjustable voltage power adapter or a fixed voltage power adapter comprises the controller being configured to:
receive, by the controller from the power adapter, a power profile via universal serial bus (USB) control signal indicating a power adapter type of the power adapter.

18. The apparatus of claim 13 wherein the controller being configured to determine a power adapter type of the power adapter as either an adjustable voltage power adapter or a fixed voltage power adapter comprises the controller being configured to:
fail to receive, by the controller from the power adapter, a power profile via universal serial bus (USB) control signal indicating a power adapter type of the power adapter; and
determine, based on the failure to receive the power profile via USB control signal indicating a power adapter type, that the power adapter is a fixed voltage power adapter.

19. An apparatus for charging a battery of a user device, the apparatus comprising:
a charge pump that converts an input voltage, received from a power adapter, to a system voltage that is less than the input voltage based on a ratio of the charge pump;
a regulator coupled between the system voltage output by the charge pump and a battery of the user device, the regulator configured to control a battery charging voltage applied to the battery of the user device and to provide isolation between the system voltage that is applied to one or more components of the user device and the battery charging voltage applied to charge the battery of the user device;

a switch, configurable to either enable or bypass the charge pump; and a controller configured to:
  determine a voltage difference between the system voltage applied to an input of the regulator and a charging voltage output by the regulator;
  determine that the power adapter is a fixed voltage power adapter that is configured to output an input voltage at a first voltage that is less than a threshold value; and
  configure the switch to bypass the charge pump, and thus avoid voltage conversion of the charge pump, based on the first voltage being less than the threshold value.

* * * * *